United States Patent
Sadowara

(10) Patent No.: US 7,746,500 B2
(45) Date of Patent: Jun. 29, 2010

(54) IMAGE FORMING APPARATUS AND IMAGE FORMING METHOD

(75) Inventor: Tetsuya Sadowara, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1052 days.

(21) Appl. No.: 11/451,210

(22) Filed: Jun. 12, 2006

(65) Prior Publication Data

US 2007/0285733 A1 Dec. 13, 2007

(51) Int. Cl.
*G06F 15/00* (2006.01)
*G06K 1/00* (2006.01)

(52) U.S. Cl. .......... 358/1.9; 358/450; 358/444
(58) Field of Classification Search .......... 358/450, 358/444, 1.12–1.18, 1.9; 382/284
See application file for complete search history.

(56) References Cited

U.S. PATENT DOCUMENTS 5,465,163 A * 11/1995 Yoshihara et al. .......... 358/444
6,222,545 B1 * 4/2001 Suzuki et al. .......... 345/418
6,381,376 B1 * 4/2002 Toyoda .......... 382/284
6,507,415 B1 * 1/2003 Toyoda et al. .......... 358/450
6,540,328 B1 * 4/2003 Yashima et al. .......... 347/43

FOREIGN PATENT DOCUMENTS

JP    2002-044317    2/2002

\* cited by examiner

*Primary Examiner*—Chan S Park
*Assistant Examiner*—Satwant K Singh
(74) *Attorney, Agent, or Firm*—Turocy & Watson, LLP

(57) ABSTRACT

An image forming apparatus according to this invention includes an image processing unit configured to input pre-image processing image data and perform various image processing, a storage unit configured to store the pre-image processing image data and repeatedly read out and output the stored pre-image processing image data to the image processing unit, and a printing unit configured to print post-image processing image data outputted from the image processing unit. With the image forming apparatus according to this invention, the work efficiency in adjustment of image processing parameters can be improved.

8 Claims, 8 Drawing Sheets

IMAGE FORMING APPARATUS AND IMAGE FORMING METHOD

BACKGROUND OF THE INVENTION

1. Technical Field of the Invention

This invention relates to an image forming apparatus and image forming method, and particularly to an image forming apparatus and image forming method for performing various image processing.

2. Related Art

An image forming apparatus such as a color multifunction peripheral is configured to perform various image processing to image data read from an original, thereby forming (printing) a sharp and clear image. Many of such apparatuses have not only a function of color printing of a color original but also a function of bicolor printing or monochrome printing of a color original by performing image processing such as color conversion, and thus realize various printing in accordance with user's purposes.

These types of image processing use various image processing parameters. Here, image processing parameters refer to threshold values for various determinations, numeric values used for various arithmetic operations performed on image data, and the like.

There image processing parameters are decided to a certain extent at the designing stage. However, since scanners and the like have difference in properties, parameter adjustment is usually carried out at the time of manufacturing (for example, at the final stage of manufacture).

In this parameter adjustment, usually, a process cycle including (1) actually reading a standard original (evaluation chart) by a scanner, (2) performing image processing to the read image data with a current image processing parameter, (3) printing image data, (4) evaluating the result of printing, (5) changing the image processing parameter on the basis of the result of the evaluation, and (6) reading the standard original again by the scanner, is repeated until a desired printing result is acquired.

A similar process cycle is often carried out for a prototype machine not only at the manufacturing stage but also at the designing stage, thus deciding image processing parameters.

In this manner, the conventional adjustment of image processing parameters requires repetition of complicated work and a long time. Therefore, it is a large obstruction against improvement in design efficiency and manufacturing efficiency.

SUMMARY OF THE INVENTION

In view of the foregoing circumstances, it is an object of this invention to provide an image forming apparatus and image forming method that enables improvement in work efficiency for adjustment of image processing parameters.

To achieve the above object, an image forming apparatus according to an aspect of this invention includes an image processing unit configured to input pre-image processing image data and perform various image processing, a storage unit configured to store the pre-image processing image data and repeatedly read out and output the stored pre-image processing image data to the image processing unit, and a printing unit configured to print post-image processing image data outputted from the image processing unit.

Also, to achieve the above object, an image forming method according to another aspect of this invention includes an image processing step of inputting pre-image processing image data and performing various image processing by an image processing unit, a storage step of storing the pre-image processing image data to a storage unit and repeatedly reading out and outputting the stored pre-image processing image data to the image processing unit, and a printing step of printing post-image processing image data outputted from the image processing unit.

BRIEF DESCRIPTION OF THE DRAWINGS

In the attached drawings.

DETAILED DESCRIPTION OF THE PREFERRED EMBODIMENTS

An embodiment of an image forming apparatus and image forming method according to this invention will be described with reference to the attached drawings.

(1) Configuration of Image Forming Apparatus

For comparison with an image forming apparatus 1 and an image forming method according this embodiment, the configuration of a conventional image forming apparatus 100 and a typical method for adjusting an image processing parameter that is conventionally carried out by using this image forming apparatus 100 will be schematically described.

Figure 7:
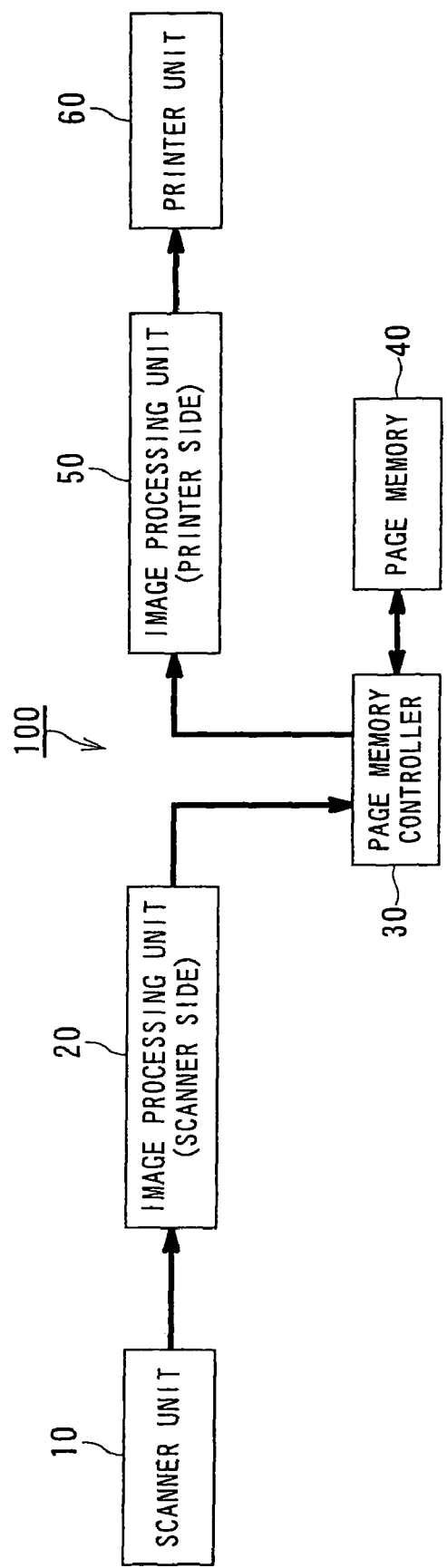
FIG. 7 is a view showing an exemplary configuration of a conventional image forming apparatus, as a comparative example to the image forming apparatus according to this embodiment.

FIG. 7 is a view showing an exemplary configuration of the conventional image forming apparatus 100. The image forming apparatus 100 includes a scanner unit 10 that reads an original and converts it to image data, an image processing unit (scanner side) 20 that performs scanner-side image processing such as color conversion processing and filtering processing to the converted image data, a page memory 40 that temporarily stores, by page, the image data to which scanner-side image processing has been performed, a page memory controller 30 that performs storage control of the page memory 40, an image processing unit (printer side) 50 that performs printer-side image processing such as gamma correction and tone processing to the image data outputted from the page memory 40, and a printer unit 60 that prints the image-processed image data to a recording paper or the like.

Figure 8:
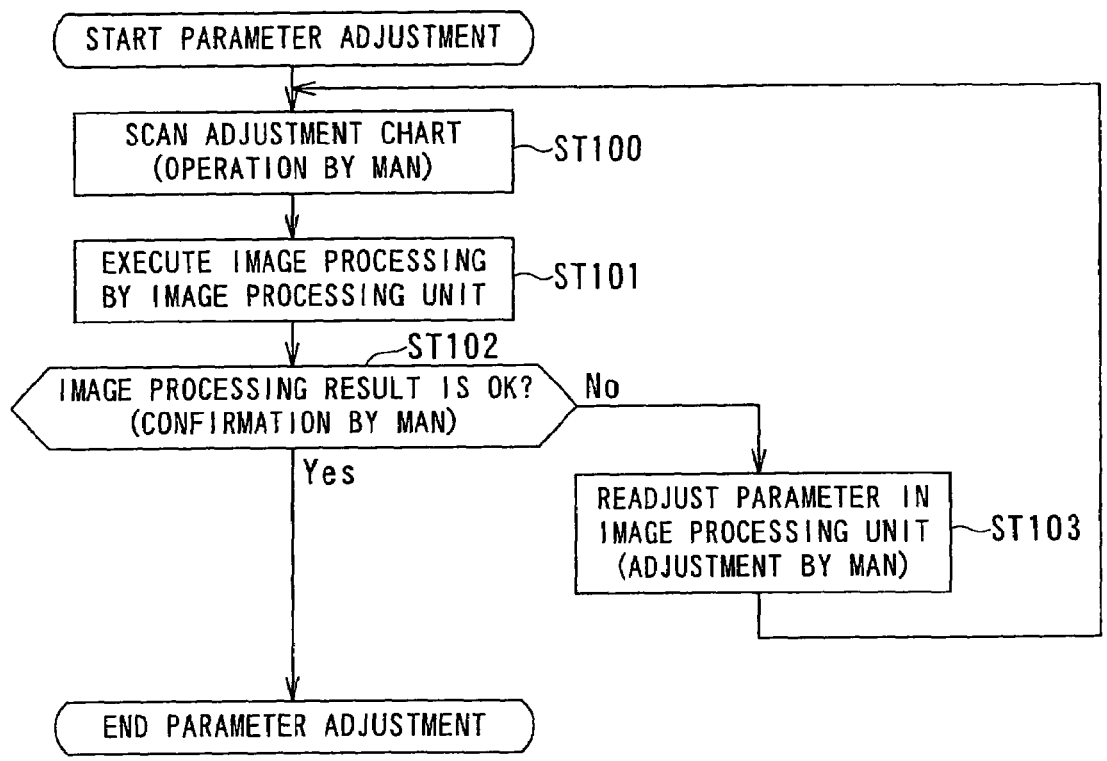
FIG. 8 is a flowchart showing an example of conventional method for adjusting an image processing parameter, as a comparative example to the image processing parameter adjusting method in the image forming apparatus according to this embodiment.

FIG. 8 is a flowchart showing a typical processing flow in the case of adjusting image processing parameters by using this image forming apparatus 100. Here, image processing parameters refer to parameters used for various image processing performed by the image processing unit (scanner side) 20 and the image processing unit (printer side) 50, for example, threshold values for various determinations, numeric values used for various arithmetic operations performed on image data, and the like.

An adjustment operator for image processing parameters first sets an evaluation chart as a standard on an original table of the scanner unit 10 and causes the scanner unit to scan this original (step ST100).

The scanner image data is automatically image-processed by the image processing unit (scanner side) 20 or the image processing unit (printer side) 50 (step ST101). The image processing parameters used at this stage are the parameters before adjustment.

The image-processed image data is printed by the printer unit 60. The adjustment operator sees the printed recording paper and determines whether desired image processing is done or not (step ST102).

If the adjustment operator determines that desired image processing is not done, the adjustment operator readjusts an image processing parameter in question, for example, by using a predetermined adjustment tool (step ST103).

After that, the processing returns to step ST100. The evaluation chart is scanned again and the adjustment operator confirms and determines the result of its printing. The adjustment operator repeats the process of step ST100 to step ST103 until desired printing result is acquired.

Here, the evaluation chart varies depending on the contents of image processing to be adjusted. For example, when an image processing parameter for reproducibility of color conversion is to be adjusted, the evaluation chart is a chart in which plural standard colors are printed. These standard colors are compared with the colors of the printing result printed by the printer unit 60, and it is determined whether the image processing parameter is good or not.

Meanwhile, for example, when an image processing parameter for color/monochrome determination processing is to be adjusted, a chart with a part color-printed and a major part printed in monochrome (see FIG. 4) is used as an evaluation chart.

Color/monochrome determination is the processing to determine whether an original is a color original or monochrome original. If it is determined that an original is a monochrome original, the copy of the original is printed by using a single color of black ink, instead of mixing plural colors to form black. On the other hand, if it is determined that an original is a color original, normal color printing is carried out.

Thus, if the image processing parameter is not properly adjusted, it is erroneously determined that an original is a monochrome original with respect to the above-described evaluation chart, and consequently the entire copy of the original including the color part is printed only with black ink.

Also in this case, the adjustment operator sees the printing result printed by the printer unit 60 and determines whether the image processing parameter for color/monochrome determination processing is good or not. If the adjustment is insufficient, the adjustment operator repeats the process of step ST100 to ST103.

In this manner, in the conventional adjustment of image processing parameters, there are many processes involving the adjustment operator, and the operations from scanning to parameter adjustment are repeated until a proper result is acquired. Therefore, the work efficiency is low and a long time is taken, causing an increase in cost.

Figure 1:
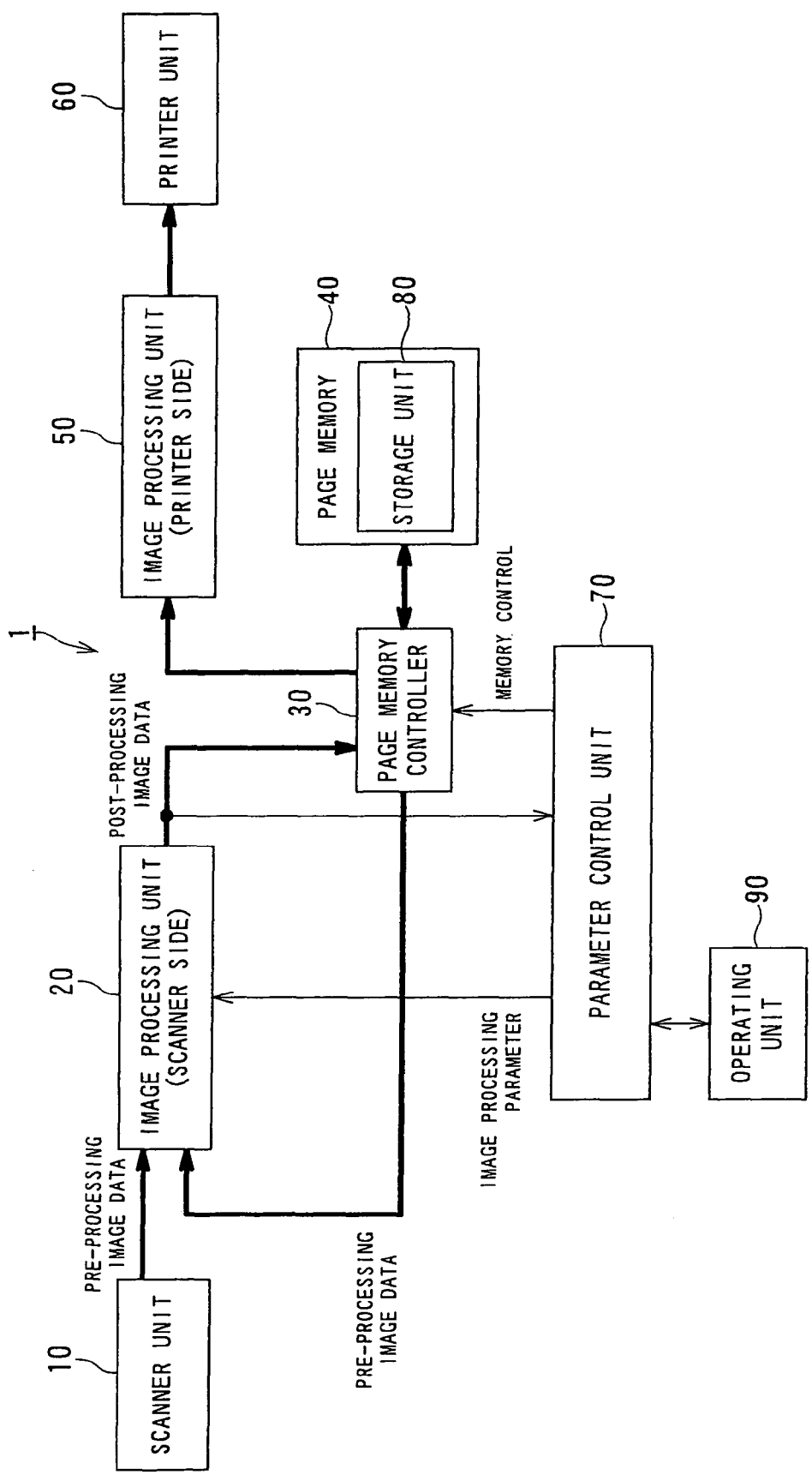
FIG. 1 is a view showing an exemplary configuration of an image forming apparatus according to an embodiment of this invention.

FIG. 1 is a view showing an exemplary configuration of the image forming apparatus 1 according to the first embodiment of this invention. It has a configuration that enables improvement in work efficiency for adjustment of image processing parameters.

The image forming apparatus 1 according to this embodiment differs from the conventional image forming apparatus 100 in that the image forming apparatus 1 has a storage unit 80, a parameter control unit 70 and an operating unit 90.

The storage unit 80 is provided in a predetermined area in the page memory 40, and pre-image processing image data read by the scanner unit 10 is inputted and stored therein via the image processing unit (scanner side) 20. The stored pre-image processing image data is configured to be repeatedly readable via the page memory controller 30, and the read-out pre-image processing image data is configured so that it can be repeatedly inputted to the image processing unit (scanner side) 20.

The parameter control unit 70 performs control of writing to the storage unit 80 via the page memory controller 30 and control of repeated reading, and also inputs the result of scanner-side image processing (various determinations results) and post-image processing image data outputted from the image processing unit (scanner side) 20 and automatically determines whether the image processing by the image processing unit (scanner side) 20 is good or not. The parameter control unit 70 also changes an image processing parameter on the basis of the determination results and sets it in the image processing unit (scanner side) 20.

The operating unit 90 is for the adjustment operator to operate the parameter control unit 70, and it includes, for example, a liquid crystal display unit and a touch panel. The operating unit 90 may be of a dedicated type provided for adjustment of image processing parameters or may be an operating unit that is normally provided in the conventional image forming apparatus 100 (not shown in FIG. 7) with additional functions.

With the configuration according to the first embodiment shown in FIG. 1, only a simple operation from the operating unit 90 makes it possible to repeatedly read out pre-image processing image data from the storage unit 80 and automatically input it to the image processing unit (scanner side) 20. As a result, the work of scanning an original many times, as is conventionally done in the adjustment of image processing parameters (step ST100 in FIG. 8), is no longer necessary.

Also, as pre-image processing image data is repeatedly inputted to the image processing unit (scanner side) 20, it is possible to optimize the image processing parameter in the image processing unit (scanner side) 20 by automatic control (feedback control). This automatic control is realized by the parameter control unit 70.

In FIG. 1, an example is shown in which the output of the image processing unit (scanner side) 20 is inputted to the parameter control unit 70 and the image processing parameter used in the image processing unit (scanner side) 20 is automatically adjusted (automatically controlled). However, the output of the image processing unit (printer side) 50 may be inputted to the parameter control unit 70 and the image processing parameter used in the image processing unit (printer side) 50 may be adjusted. Alternatively, the outputs of the two image processing units 20, 50 may be inputted to the parameter control unit 70 and the image processing parameters of the two may be adjusted.

Figure 2:
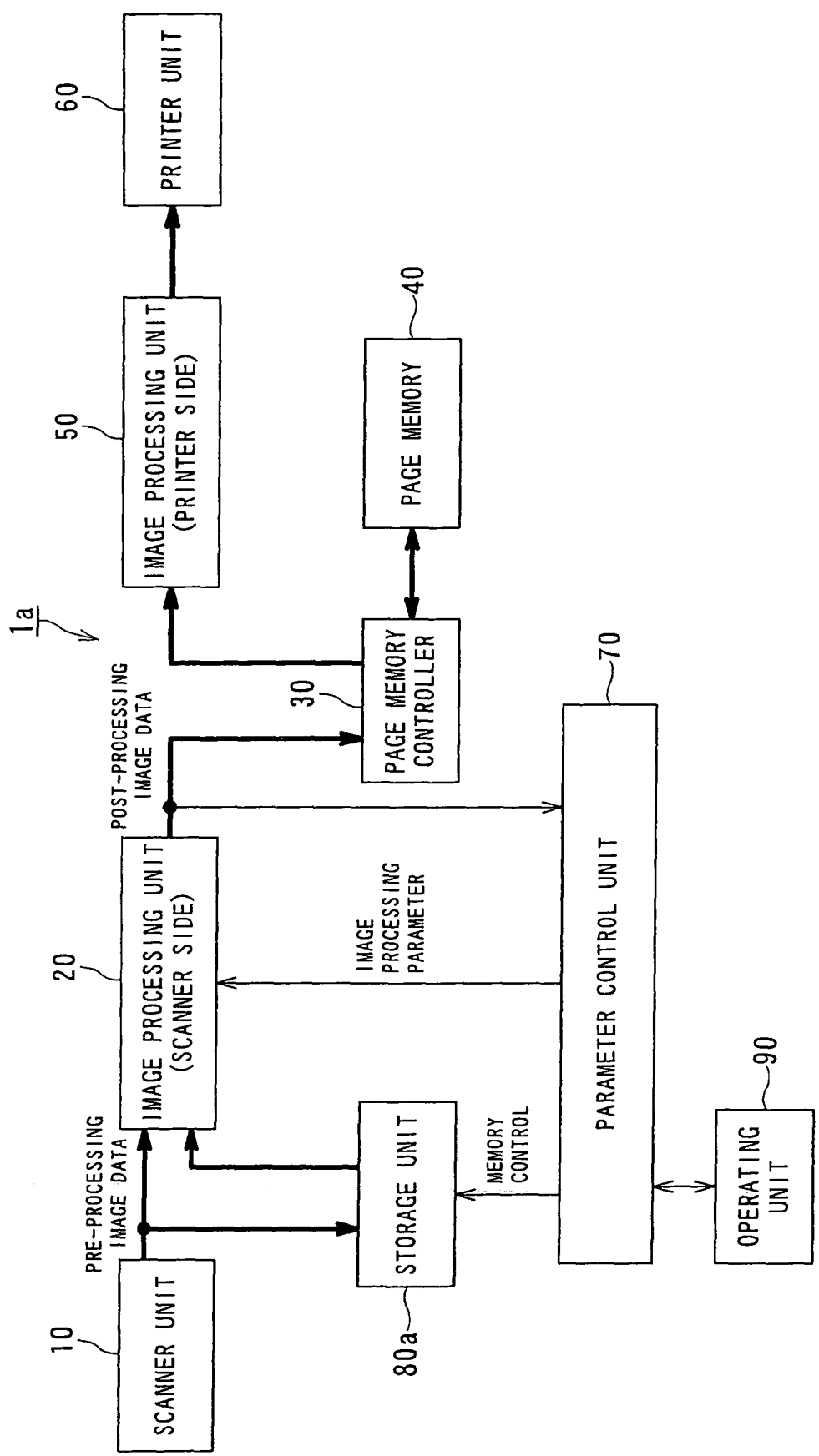
FIG. 2 is a view showing an exemplary configuration of an image forming apparatus according to another embodiment of this invention.

In FIG. 1, an example is shown in which the storage unit 80 is provided in a predetermined area in the page memory 40. However, a separate storage unit 80a may be provided outside of the page memory 40 (second embodiment), as shown in FIG. 2. The storage unit 80a is provided, for example, in an HDD or the like, not shown. In this case, pre-image processing image data is directly inputted to the storage unit 80a from the output of the scanner unit 10, not via the image processing unit (scanner side) 20.

Also in the first embodiment (see FIG. 1), the storage unit 80 is not limited to the inside of the page memory 40 and may be provided in an HDD, not shown.

In any case, there is no difference with respect to the adjustment of image processing parameters, and the configuration according to the first embodiment shown in FIG. 1 will be used in the following description.

(2) Automatic Adjustment of Image Processing Parameter

Next, automatic adjustment of an image processing parameter will be described, using color/monochrome determination processing (it may also be referred to as ACS determination (Auto-Color-Select determination)) as a specific example.

First, color/monochrome determination processing itself will be schematically described. Color/monochrome determination processing is the processing to automatically determine whether a read original is a color original or monochrome original, and color/monochrome determination processing usually involves two stages of determination processing.

The determination in the first stage is the determination by pixel. Whether each pixel in an original is a color pixel or monochrome pixel is determined for all the pixels. In this determination by pixel, for example, each of the following formulas is used for determination.

$$|R-G| < THr \quad \text{(Formula 1)}$$

$$|G-B| < THg \quad \text{(Formula 2)}$$

$$|B-R| < THb \quad \text{(Formula 3)}$$

Here, R, G, B represent the levels of red, green and blue outputted from the scanner unit 10. If a pixel is achromatic (monochrome), the values of R, G, B are substantially equal (ideally, R=G=B). Formulas 1 to 3 utilize this characteristic and when all of Formulas 1 to 3 are satisfied, the pixel in question is determined to be a monochrome pixel.

On the other hand, if even one of Formulas 1 to 3 is not satisfied, the pixel in question is determined to be a color (chromatic) pixel.

The determination in the second stage is the determination by original (by page). The number of the pixels that are determined to be color pixels in the first stage of determination (hereinafter referred to as color-determined pixels) is counted, and if the counted number of color-determined pixels A exceeds a predetermined threshold value THc, the original in question is determined to be a color original. Conversely, if the number of color-determined pixels A is equal to or less than the predetermined threshold value THc, the original in question is determined to be a monochrome original.

That is, if $$A \leq THc \quad \text{(Formula 4)}$$

holds, the read original is determined to be a monochrome original.

When a monochrome original is read by the scanner unit 10, ideally, R=G=B should hold with respect to each pixel. Practically, however, the values of R, G, B do not perfectly coincide with each other because of the difference in sensitivity among the reading sensors of the scanner unit 10. As a result, in the determination by pixel, false pixels can be included as color-determined pixels. To avoid wrong determination of a monochrome original as a color original because of these false pixels, the determination is made in two stages, including the determination by page as well as the determination by pixel.

Next, the method for automatically adjusting an image processing parameter for color/monochrome determination processing by using the image forming apparatus 1 according to this embodiment will be described. In the above-described color/monochrome determination processing, the four threshold values THr, THg, THb and THc are image processing parameters.

Of these, the three threshold values THr, THg and THb for the determination by pixel are preset and fixed so as to make proper determination (a color pixel as a color pixel, and a monochrome pixel as a monochrome pixel). The threshold value THc used for the determination by page is automatically adjusted.

If the three threshold values THr, THg and THb are fixedly set, the amount of wrong determinations by pixel can vary depending on the type of original, the difference in characteristics among the sensors of the scanner unit 10, and so on. To absorb this variance and ultimately made proper color/monochrome determination by page, the threshold value THc used for the determination by page is adaptively and automatically adjusted in this embodiment.

Figure 3:
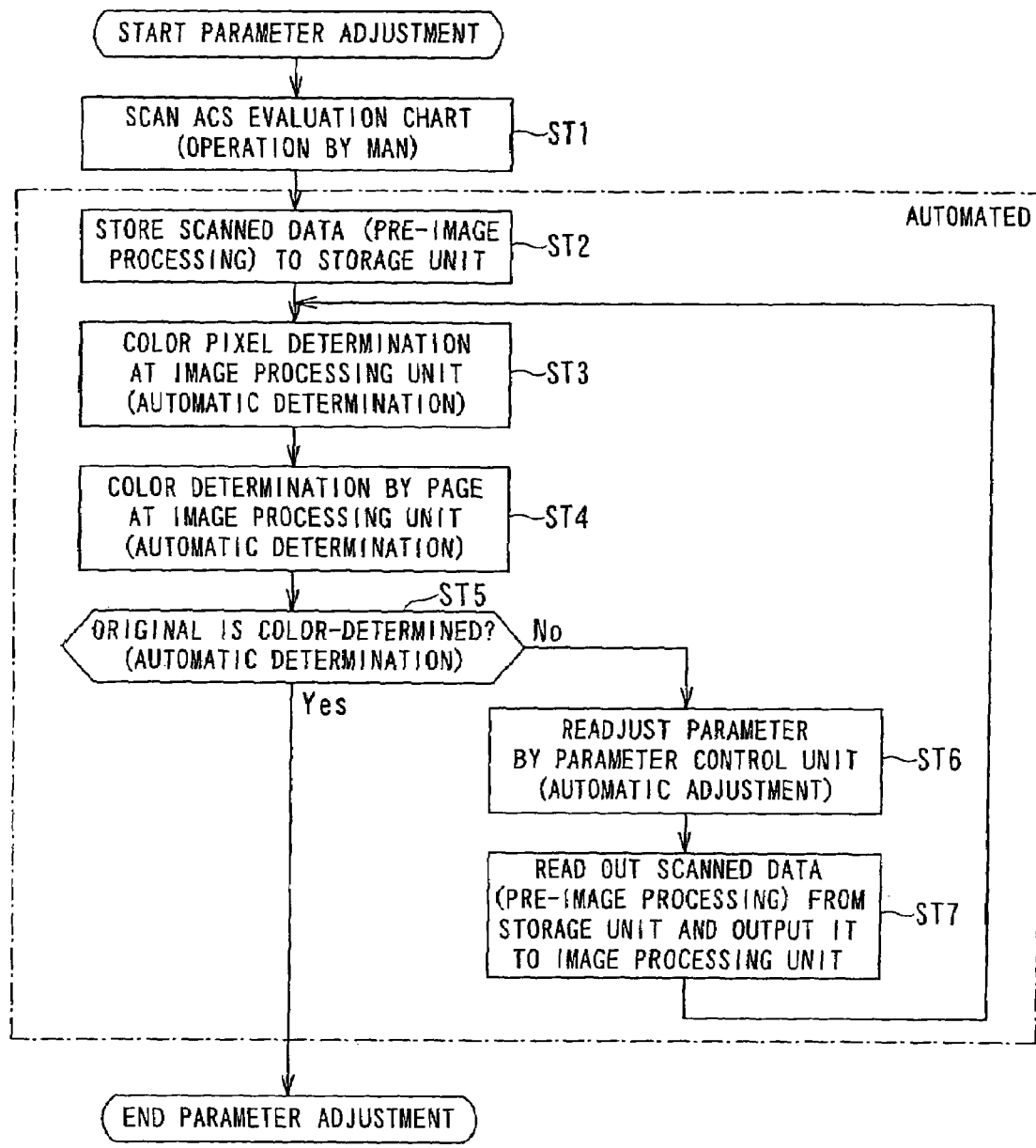
FIG. 3 is a flowchart showing an exemplary method for adjusting an image processing parameter using an image forming apparatus according an embodiment of this invention.

FIG. 3 is a flowchart for explaining the method for automatically adjusting an image processing parameter for color/monochrome determination processing, in the image forming apparatus 1 according to this embodiment.

First, in step ST1, an ACS determination evaluation chart (hereinafter referred to simply as evaluation chart) is set on the original table of the image forming apparatus 1, and the evaluation chart is scanned.

Figure 4:
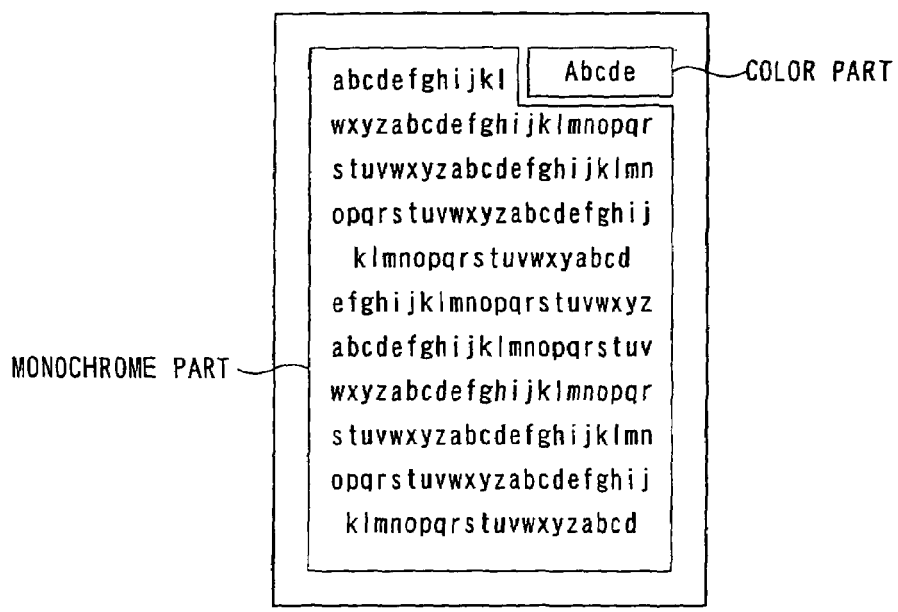
FIG. 4 is a view showing an exemplary evaluation chart used for color/monochrome determination processing according to this embodiment.

FIG. 4 is a view showing an exemplary evaluation chart. In this example, a major part of the original (evaluation chart) contains monochrome characters, and an upper right part contains color characters.

Figure 5A:
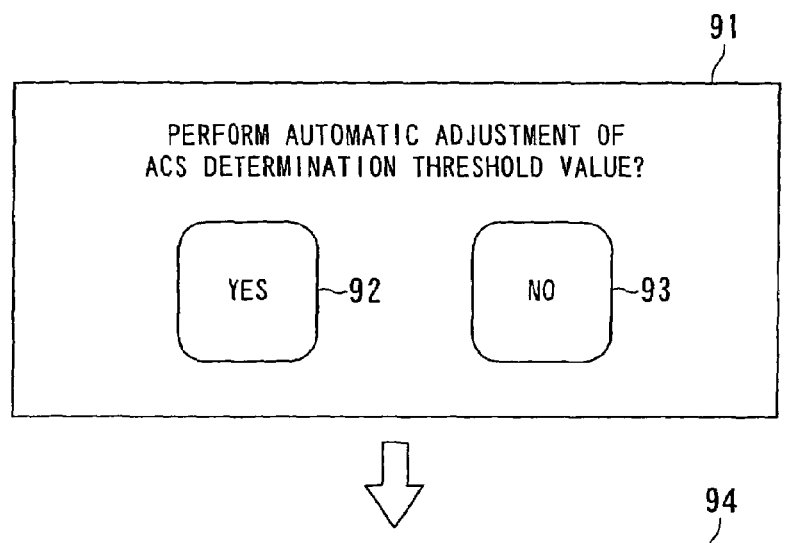
FIGS. 5A and 5B are views showing an exemplary display of an operating unit of the image forming apparatus according to this embodiment.
Figure 5B:
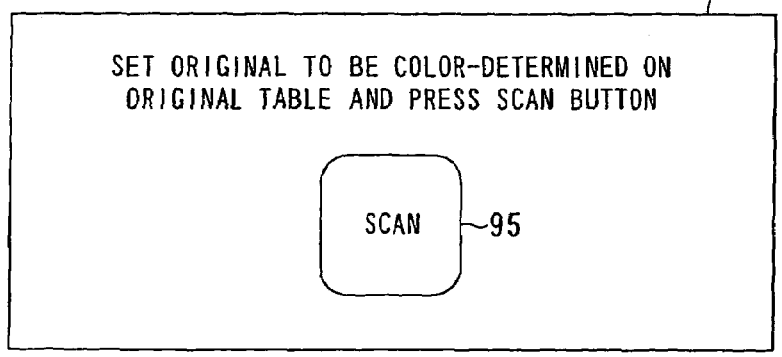

FIG. 5 is a view showing an exemplary display shown in the operating unit 90. As shown in FIG. 5A, "Perform automatic adjustment of ACS determination threshold?" or the like is displayed on a display screen 91 of the operating unit 90, and the adjustment operator or user selects "Yes" or "No", for example, by using a touch panel or the like. If "Yes" is selected, the display screen of the operating unit 90 switches to a display screen 94 of FIG. 5B and scanning of the evaluation chart is started by pressing a "Scan" display part 95.

The processing of steps ST2 to ST7 is the automatic processing by the image forming apparatus 1.

In step ST2, pre-image processing image data read by the scanner unit 10 is stored into the storage unit 80 provided in the page memory unit 40 via the image processing unit (scanner side) 20.

Meanwhile, the image processing unit (scanner side) 20 performs image processing (color/monochrome determination processing) to the image data read by the scanner unit 10.

In step ST3, as the first stage of color/monochrome determination processing, the determination by pixel is made in accordance with Formulas 1 to 3.

In step ST4, as the second stage of color/monochrome determination processing, the number of color-determined pixels determined in step ST3 is counted, and the counted number of color-determined pixels A is compared with the threshold value THc, thus determining whether the original (evaluation chart) is a color original or monochrome original. The image processing parameter used in step ST4, that is, threshold value THc, is a pre-adjustment value, and the threshold value THc as an initial value is used as the first value.

Figure 6A:
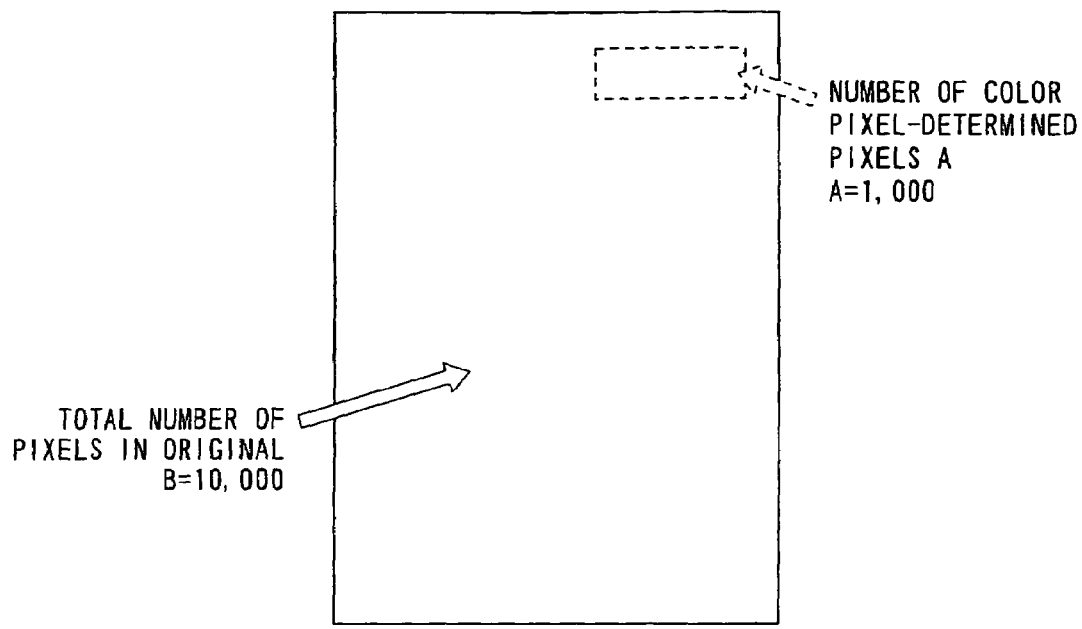
FIG. 6A and FIG. 6B are views for explaining the concept of a method for adjusting an image processing parameter for color/monochrome determination processing according to this embodiment.

FIG. 6 shows the concept of the method for automatic adjustment of the threshold value THc. FIG. 6A is a view showing that the total number of pixels B of the original (evaluation chart) is, for example, 10,000, and of these, the number of color-determined pixels A determined in step ST3 is 1,000.

Figure 6B:
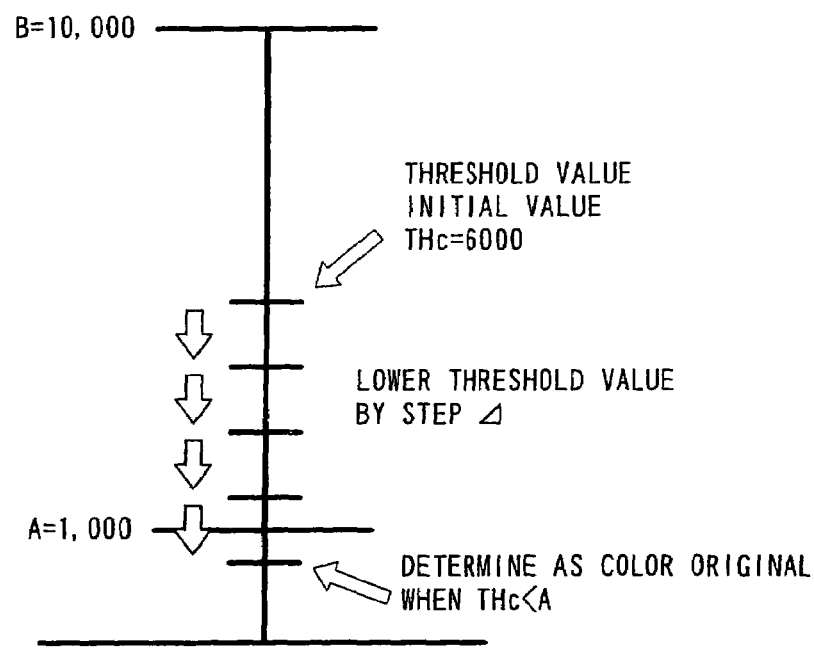

FIG. 6B is a view showing the procedure for changing the threshold value THc. The initial value of the threshold value THc is set at a sufficiently high value with respect to the number of color-determined pixels A, for example, 6,000. Therefore, at this stage, the evaluation chart is determined to be a monochrome original. This threshold value THc is sequentially lowered by a predetermined step $\Delta$, for example, 100, and the threshold value THc at the time when the evaluation chart is determined to be a color original is set as the ultimate threshold value THc in the image processing unit (scanner side) 20.

The procedure for changing this threshold value THc is realized by repeating the processing of steps ST3 to ST7 in FIG. 3.

In step ST5, the parameter control unit 70 inputs the determination result of color/monochrome determination processing outputted from the image processing unit (scanner side) 20, and the parameter control unit 70 determines whether the original is color-determined or not. As long as it is determined to be monochrome, (No in step ST5), it means that the adjustment of the threshold value THc is insufficient. The processing shifts to step ST6 to make readjustment of the image processing parameter. Specifically, the threshold value THc is adjusted to be a value lower than the current value by a step $\Delta$, and this value is set in the image processing unit (scanner side) 20.

Next, the pre-image processing image data stored in the storage unit 80 is read out and outputted to the image processing unit (scanner side) 20 (step ST7). The processing returns to step ST3.

As the above cycle is repeated, the pre-image processing image data stored in the storage unit 80 is repeatedly inputted to the image processing unit (scanner side) 20, and the proper threshold value THc for determining this image data to be a color image is adjusted to a proper value. Here, the proper threshold value THc is a threshold value that is low enough to enable secure color determination of a color original, and also a threshold value that is high enough to prevent color determination (wrong determination) of a monochrome original. Such a threshold value can be acquired by the procedure of setting a high threshold value as an initial value (in this stage, monochrome determination is made) and gradually lowering this value until color determination is made, as illustrated in FIG. 6B.

Figure 9:
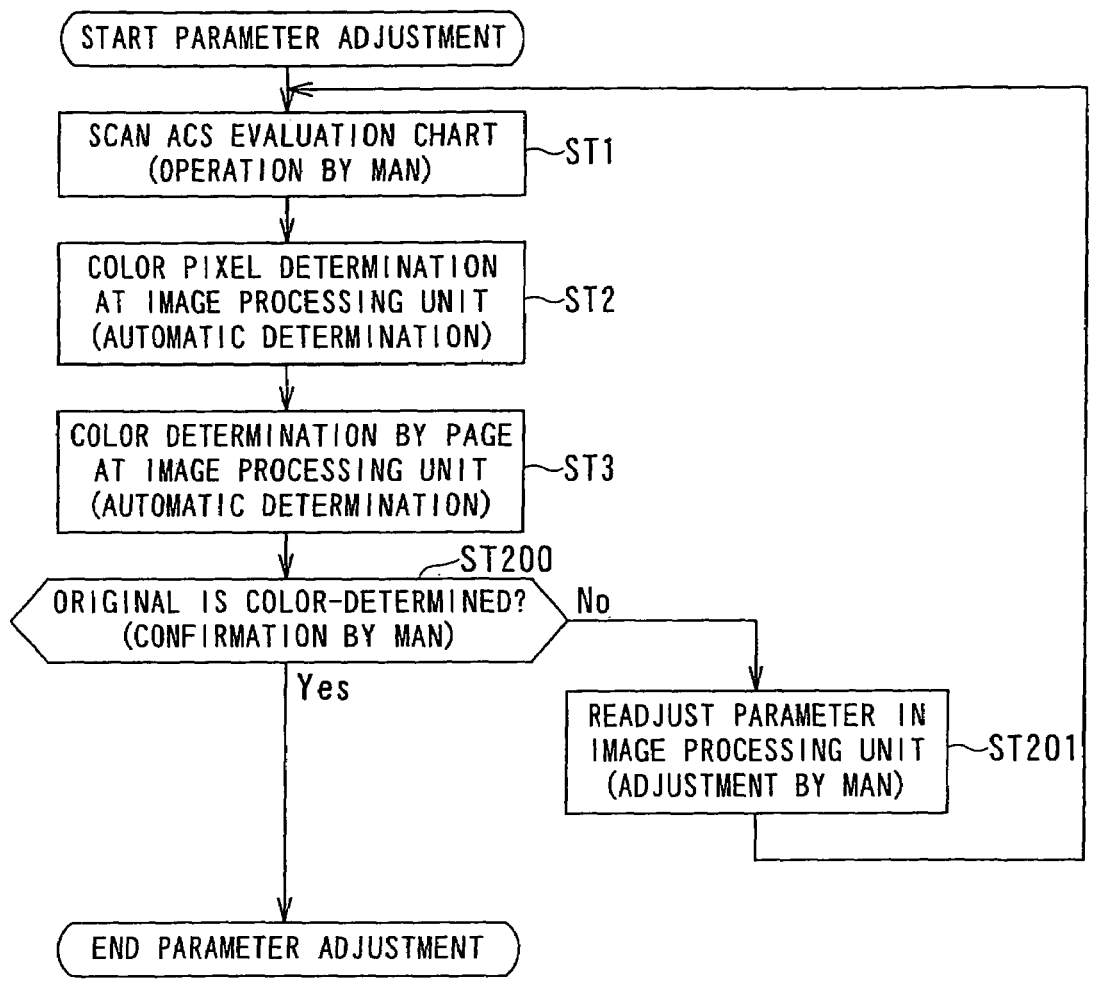
FIG. 9 is a flowchart showing an example of conventional method for adjusting an image processing parameter for color/monochrome determination processing, as a comparative example to the image processing parameter adjusting method for color/monochrome determination processing in the image forming apparatus according to this embodiment.

FIG. 9 is a flowchart showing a flow of color/monochrome determination processing carried out in the conventional image forming apparatus 100, for comparison with the color/monochrome determination processing by the image forming apparatus 1 according to this embodiment.

The processing of each of steps ST1 to ST3 is the same as in this embodiment. However, determination on whether an original is color-determined or not is made by a man (step ST200). Also the operation to change the value of the image processing parameter (threshold value THc) on the basis of the determination result and to reset the value in the image processing unit (scanner side) 20 is carried out by a man (step ST201). Moreover, to narrow the image processing parameter to a proper value, the adjustment operations by a man, including the original scanning operation by a man, must be repeated many times.

With the image forming apparatus 1 according to this embodiment, these repeated operations by a man are no longer necessary and the work efficiency in the adjustment of the image processing parameter can be improved.

The conventional adjustment of image processing parameters depends exclusively on the operation by an adjustment operator at the manufacturer and the operation by a serviceman after the shipment. This is because the adjustment operation is complicated and troublesome.

On the other hand, with the image forming apparatus 1 according to this embodiment, the adjustment operation for image processing parameters is significantly simplified. Therefore, a general user can adjust a relatively simple image processing parameter in accordance with the user's own preference.

In the above description, color/monochrome determination processing is described as an example of image processing. However, this embodiment, in which pre-image processing image data is stored into the storage unit 80 and this image data is repeatedly inputted to the image processing unit (scanner side) 20 or the image processing unit (printer side) 50, can also be applied to the adjustment of image processing parameters for other image processing.

For example, for an original containing characters and non-characters (photographs and the like), image processing of determining a character area is applied. In this character area determination processing, a character area is detected by utilizing a characteristic that neighboring pixels on the boundary between a character area and a non-character area have a large level difference. That is, if the level difference between the neighboring pixels is larger than a predetermined threshold value THd, it is determined that there is a boundary between a non-character area and a character area, and the range of the character area is determined by this boundary. Also in this character area determination processing, the threshold value THd is repeatedly updated from its initial value so that, for example, the number of pixels in a character area of an evaluation chart and the number of pixels in a character area that is actually determined by the image forming apparatus 1 substantially coincide with each other. Thus, the threshold value can be ultimately set at a proper value.

This invention is not limited to the above embodiment, and in the practical stage, the components can be modified and embodied without departing from the scope of the invention. Also, various inventions can be formed by appropriate combinations of plural components disclosed in the above embodiment. For example, several components of all the components disclosed in the embodiment may be deleted. Moreover, components of different embodiments may be appropriately combined.

What is claimed is:

1. An image forming apparatus comprising:
a scanner unit configured to read an original;
an image processing unit configured to input image data before image-processing from the scanner and determine whether the original is a monochrome original or a color original by a threshold value;
a storage unit configured to store the image data before image-processing
a parameter control unit configured to adjust the threshold value and set the adjusted threshold value in the image processing unit; and
a printing unit configured to print image data outputted from the image processing unit in a single black color when the original is determined to be a monochrome original, and in multiple colors when the original is determined to be a color original,
wherein, when the threshold value is adjusted,
an evaluation chart including a major monochrome part and a minor color part is set in the scanner unit and read by the scanner unit, and
the parameter control unit performs:
a) setting an initial value of the threshold value high enough that the image processing unit determines the evaluation chart is a monochrome original,
b) controlling to write image data of the evaluation chart before image-processing into the storage unit,
c) controlling to read the image data of the evaluation chart before image-processing from the storage unit,
d) sending the read image data of the evaluation chart before image-processing to the image processing unit,
e) inputting a determination result of the image processing unit, and
f) repeating the step c) through e), while changing the threshold value in a decreasing direction and setting the changed threshold value in the image processing unit, until the image processing unit determines the evaluation chart is a color original.

2. The image forming apparatus according to claim 1, further comprising a page memory unit configured to temporarily store the image data outputted from the image processing unit and output the stored the image data to the printing unit,
wherein the storage unit is configured as a predetermined storage area in the page memory unit, and
the image data stored in the storage unit is inputted from the scanner unit via the image processing unit.

3. The image forming apparatus according to claim 1, further comprising an operating unit configured to enable a user to operate execution of automatic setting of the parameter.

4. The image forming apparatus according to claim 2, further comprising an operating unit configured to enable a user to operate execution of automatic setting of the parameter.

5. An image forming method, comprising the:
reading an original by a scanner unit;
inputting image data before image-processing from the scanner unit and determining whether the original is a monochrome original or a color original by a threshold value by an image processing unit;
storing the image data before image-processing to a storage unit;
adjusting the threshold value and setting the adjusted threshold value in the image processing unit by a parameter control unit; and
printing image data outputted from the image processing unit in a single black color when the original is determined to be a monochrome original, and in multiple colors when the original is determined to be a color original,
wherein, when the threshold value is adjusted,
an evaluation chart including a major monochrome part and a minor color part is set in the scanner unit and read by the scanner unit, and
the adjusting step further comprises:
a) setting an initial value of the threshold value high enough that the image processing unit determines the evaluation chart is a monochrome original,
b) controlling to write image data of the evaluation chart before image-processing into the storage unit,
c) controlling to read the image data of the evaluation chart before image-processing from the storage unit,
d) sending the read image data of the evaluation chart before image-processing to the image processing unit,
e) inputting a determination result of the image processing unit, and
f) repeating the step c) through e), while changing the threshold value in a decreasing direction and setting the changed threshold value in the image processing unit, until the image processing unit determines the evaluation chart is a color original.

6. The image forming method according to claim 5, further comprising temporarily storing the image data outputted from the image processing unit in a page memory and outputting the image data to the printing unit,
wherein the storage unit is configured as a predetermined storage area in the page memory unit, and
the image data stored in the storage unit is inputted from the scanner unit via the image processing unit.

7. The image forming method according to claim 5, wherein the step of automatically setting the parameter is executed by an instruction inputted from an operating unit.

8. The image forming method according to claim 6, wherein the step of automatically setting the parameter is executed by an instruction inputted from an operating unit.

* * * * *